(12) United States Patent
Lan et al.

(10) Patent No.: US 8,933,355 B2
(45) Date of Patent: Jan. 13, 2015

(54) SWITCH TRIGGERING DEVICE

(71) Applicant: Primax Electronics Ltd., Neihu, Taipei (TW)

(72) Inventors: Shih-Chieh Lan, Taipei (TW); Ying-Che Tseng, Taipei (TW)

(73) Assignee: Primax Electronics Ltd., Neihu (TW)

( * ) Notice: Subject to any disclaimer, the term of this patent is extended or adjusted under 35 U.S.C. 154(b) by 250 days.

(21) Appl. No.: 13/689,945

(22) Filed: Nov. 30, 2012

(65) Prior Publication Data

US 2014/0076701 A1 Mar. 20, 2014

(30) Foreign Application Priority Data

Sep. 14, 2012 (TW) ................................. 10113373 A

(51) Int. Cl.
*H01H 3/12* (2006.01)
*H01H 13/14* (2006.01)
*H01H 13/02* (2006.01)

(52) U.S. Cl.
CPC ..................................... *H01H 13/02* (2013.01)
USPC ............................ 200/341; 345/163; 200/337

(58) Field of Classification Search
USPC .................. 200/341, 330, 331, 333, 337, 338
See application file for complete search history.

(56) References Cited

U.S. PATENT DOCUMENTS

| | | | | |
|---|---|---|---|---|
| 6,166,721 A * | 12/2000 | Kuroiwa et al. | ............... | 345/163 |
| 6,340,966 B1 * | 1/2002 | Wang et al. | ................... | 345/163 |
| 8,772,660 B2 * | 7/2014 | Liang et al. | ................... | 200/345 |

* cited by examiner

*Primary Examiner* — R S Luebke
*Assistant Examiner* — Lheiren Mae A Caroc
(74) *Attorney, Agent, or Firm* — Kirton McConkie; Evan R. Witt

(57) ABSTRACT

A switch triggering device of an electronic device is provided. By the switch triggering device, a switch on a top surface of a circuit board can be controlled from a bottom side of the electronic device. The switch triggering device includes a first linkage element, a second linkage element and a third linkage element, which are arranged between an upper cover and a base of the electronic device. The second linkage element is pivotally coupled to the upper cover. The two ends of the second linkage element are pivotally coupled to the first linkage element and the third linkage element, respectively. When the first linkage element is pressed from the base and moved toward the upper cover, the second linkage element is rotated relative to the upper cover. Consequently, the third linkage element is correspondingly moved toward the switch so as to trigger the switch.

5 Claims, 3 Drawing Sheets

SWITCH TRIGGERING DEVICE

FIELD OF THE INVENTION

The present invention relates to a switch triggering device, and more particularly to a switch triggering device of an electronic device.

BACKGROUND OF THE INVENTION

An electronic device such as a mouse or a keyboard is usually equipped with one or more function keys for transferring commands. For example, by pressing a pairing key of a mouse or a keyboard, the mouse or the keyboard can be in communication with a computer through a wireless receiver. Generally, in a case that the function keys are exposed to an upper casing of the electronic device, the switches to be controlled by the function keys are located at a top surface of a circuit board. In a case that the function keys are exposed to a lower casing of the electronic device, the switches to be controlled by the function keys are located at a bottom surface of the circuit board.

Hereinafter, a switch triggering device will be illustrated by referring to the structure of a conventional mouse. FIG. 1 is a schematic exploded view illustrating the structure of a conventional mouse.

First of all, the components of the conventional mouse 1 will be illustrated as follows. The conventional mouse 1 comprises an upper cover 11, a circuit board 12, a base 13, and a button 14.

The upper cover 11 is divided into a left button zone 11a and a right button zone 11b with respect to a middle portion of the upper cover 11. Moreover, some electronic components 12a, two first switches 12b and a second switch 12c are disposed on the circuit board 12. The base 13 has a first perforation 13a.

Hereinafter, a sequence of assembling the conventional mouse 1 will be illustrated with reference to FIG. 1 continuously.

Firstly, most of the electronic components required for the mouse 1 and the two first switches 12b are mounted on a top surface of the circuit board 12. As shown in FIG. 1, the electronic component 12a is a displacement sensing module. The second switch 12c is disposed on a bottom surface of the circuit board 12. For clarification and brevity, not all of the electronic components on the top surface of the circuit board 12 are shown in FIG. 1.

Then, the upper cover 11 and the base 13 are combined together to result in a casing with a receiving space, and the circuit board 12 is accommodated within the receiving space.

The two first switches 12b are disposed under the left button zone 11a and the right button zone 11b, respectively. The second switch 12c is covered by the button 14, and the button 14 is penetrated through the first perforation 13a of the base 13.

The operations of the switch triggering device of the conventional mouse 1 will be illustrated with reference to FIG. 1 continuously.

In a case that the button 14 at the bottom of the mouse 1 is pressed by the user, the button 14 is moved upwardly to push the second switch 12c, so that the second switch 12c is triggered to be selectively turned on or turned off.

In a case that the left button zone 11a or the right button zone 11b at the upper cover 11 of the mouse 1 is pressed by the user, the corresponding first switch 12b under the left button zone 11a or the right button zone 11b is correspondingly pressed. Under this circumstance, the corresponding first switch 12b is triggered to execute a computer command (e.g. a select command, a cut command, a copy command or a paste command).

From the above discussions, in the conventional electronic device, the switch on the top surface of the circuit board is controlled by pressing the button zone at the top cover, and the switch on the bottom surface of the circuit board is controlled by pressing the button at the base.

In some situations, the seldom-used switch (e.g. the switch to be controlled by a connect button of a wireless mouse or a keyboard) may be disposed on the top surface of the circuit board, and an addition push key is located at the upper cover to trigger the switch. However, the possibility of erroneously touching the push key is increased, and the overall appearance of the electronic device is not aesthetically pleasing. For avoid the erroneous touching action, the button may be located at the base and the corresponding switch may be disposed on the bottom surface of the circuit board. Thus the complexity of fabricating the circuit board is increased for installing only a single electronic component on the bottom surface of the circuit board.

Therefore, there is a need of providing an improved switch triggering device in order to eliminate the above drawbacks.

SUMMARY OF THE INVENTION

The present invention provides a switch triggering device of an electronic device for triggering a switch on a top surface of a circuit board by operating a button at a bottom of the electronic device.

In accordance with an aspect of the present invention, there is provided a switch triggering device of an electronic device. The electronic device includes an upper cover, a base, a circuit board and a switch. The circuit board is arranged between the upper cover and the base. The switch is disposed on a top surface of the circuit board. The switch triggering device includes a first linkage element, a second linkage element, a third linkage element, and an elastic element. The first linkage element is penetrated through a through-hole of the circuit board, and includes a first end and a second end. The first end of the first linkage element is inserted into the base. The second linkage element includes a third end, a fourth end, and a connecting part. The third end of the second linkage element is pivotally coupled to a second end of the first linkage element. The connecting part is arranged between the third end and the fourth end of the second linkage element. Moreover, the connecting part is pivotally coupled to the upper cover, so that the second linkage element is rotatable relative to the upper cover. The third linkage element is pivotally coupled to the fourth end of the second linkage element, and disposed over the switch. The elastic element is connected with the upper cover and the second linkage element for providing a restoring force to the second linkage element. When the first end of the first linkage element is pressed and moved toward the upper cover, the second linkage element is rotated relative to the upper cover, so that the third linkage element is correspondingly moved toward the switch.

In an embodiment, the switch triggering device further includes a button, which is located at the base. When the button is pressed, the first linkage element is correspondingly moved.

In an embodiment, the upper cover includes a protrusion block. The protrusion block is disposed on an inner surface of the upper cover. The connecting part of the second linkage element is pivotally coupled to the protrusion block.

In an embodiment, the electronic device is a mouse or a keyboard.

In an embodiment, the switch is a push switch or a photo interrupter switch.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
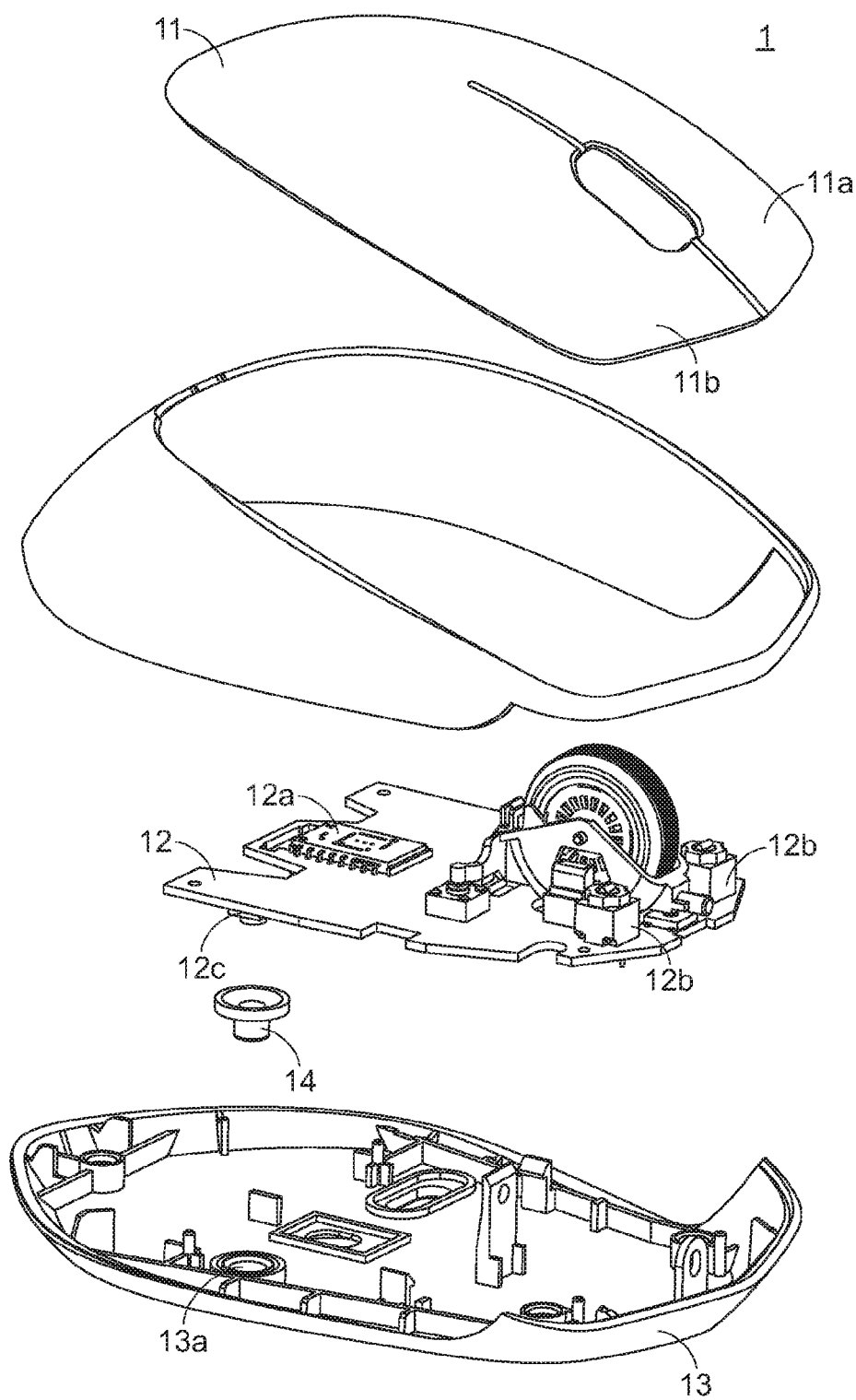
FIG. 1 is a schematic exploded view illustrating the structure of a conventional mouse.
Figure 2:
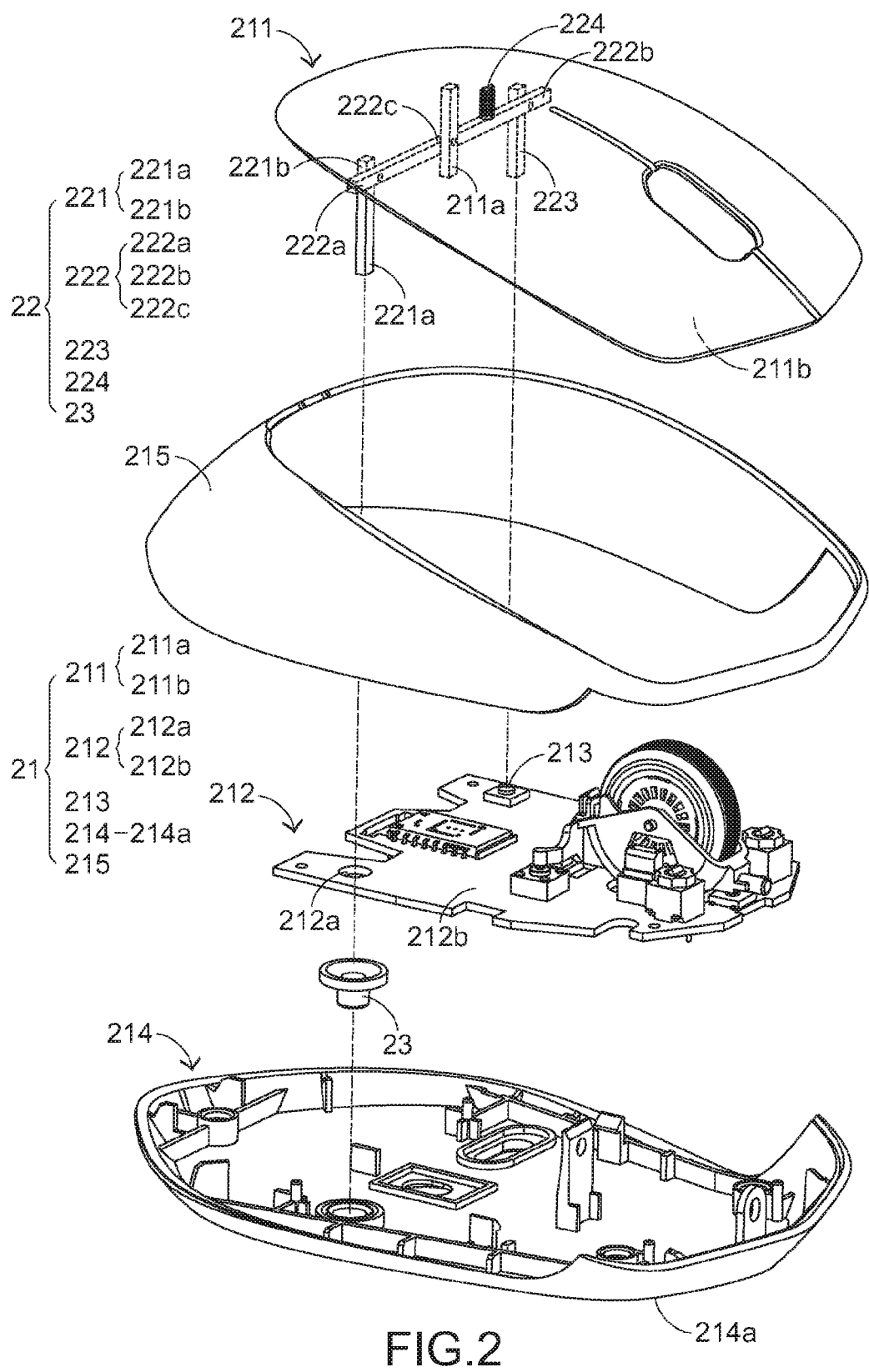
FIG. 2 is a schematic exploded view illustrating a first exemplary switch triggering device of an electronic device according to an embodiment of the present invention.

The present invention provides a switch triggering device of an electronic device. FIG. 2 is a schematic exploded view illustrating a first exemplary switch triggering device of an electronic device according to an embodiment of the present invention.

First of all, the components of the switch triggering device 22 and the electronic device 21 will be illustrated as follows.

As shown in FIG. 2, the electronic device 21 comprises an upper cover 211, a circuit board 212, a push switch 213, a base 214, and a casing 215. The switch triggering device 22 comprises a first linkage element 221, a second linkage element 222, a third linkage element 223, an elastic element 224, and a button 23.

Moreover, the upper cover 211 comprises a protrusion block 211a. The protrusion block 211a is disposed on an inner surface 211b of the upper cover 211. The circuit board 212 has a through-hole 212a. The button 23 is disposed on the base 214 and protruded through a bottom surface 214a of the base 214. It is note that the components as shown in FIG. 2 are presented herein for purpose of illustration and description only. The shapes and materials of the first linkage element 221, the second linkage element 222 and the third linkage element 223 are not restricted. In this embodiment, the first linkage element 221, the second linkage element 222 and the third linkage element 223 are linkage posts with arbitrary profiles. Moreover, in this embodiment, the first linkage element 221, the second linkage element 222 and the third linkage element 223 are made of plastic materials.

Hereinafter, a sequence of assembling the switch triggering device 22 and the electronic device 21 will be illustrated with reference to FIG. 2.

Firstly, the upper cover 211 and the base 214 are coupled with a top side and a bottom side of the casing 215. Consequently, a receiving space is defined between the upper cover 211, the base 214 and the casing 215.

Then, the circuit board 212 is disposed within the receiving space, wherein the push switch 213 is disposed on a top surface 212b of the circuit board 212.

Then, the first linkage element 221 is penetrated through the through-hole 212a of the circuit board 212, and a first end 221a of the first linkage element 221 is inserted into the base 214. In this embodiment, the first end 221a of the first linkage element 221 is disposed over the button 23 and contacted with the button 23.

Moreover, the second linkage element 222 comprises a third end 222a, a fourth end 222b, and a connecting part 222c.

The connecting part 222c is arranged between the third end 222a and the fourth end 222b of the second linkage element 222. In addition, the connecting part 222c is pivotally coupled to the protrusion block 211a of the upper cover 211. The third end 222a of the second linkage element 222 is pivotally coupled to a second end 221b of the first linkage element 221.

Moreover, the third linkage element 223 is disposed over the push switch 213, and pivotally coupled to the fourth end 222b of the second linkage element 222.

Afterwards, a first end of the elastic element 224 is connected with the inner surface 211b of the upper cover 211, and a second end of the elastic element 224 is connected with the fourth end 222b of the second linkage element 222.

The operations of the switch triggering device 22 and the electronic device 21 will be illustrated in more details as follows.

Firstly, by pressing the button 23, the first end 221a of the first linkage element 221 is pushed by the button 23 in a direction toward the upper cover 211. Consequently, the first linkage element 221 is moved toward the upper cover 211.

Since the connecting part 222c of the second linkage element 222 is pivotally coupled to the protrusion block 211a of the upper cover 211 and the third end 222a of the second linkage element 222 is pivotally coupled to the second end 221b of the first linkage element 221, the second linkage element 222 is pushed by the first linkage element 221. Under this circumstance, the second linkage element 222 is rotated by using the connecting part 222c as a center of rotation.

Consequently, the fourth end 222b of the second linkage element 222 is moved toward the base 214. Correspondingly, the third linkage element 223 is moved toward the push switch 213 to press the push switch 213. Under this circumstance, the push switch 213 is switched from an off state to an on state in order to generate a corresponding signal.

When the button 23 is no longer pressed by the user, the pushing force exerted on the first linkage element 221 is eliminated. Consequently, the fourth end 222b of the second linkage element 222 is pulled by the elastic element 224. Meanwhile, the fourth end 222b of the second linkage element 222 is moved toward the upper cover 211. Correspondingly, the second linkage element 222 is rotated again by using the connecting part 222c as the center of rotation. As a consequence, the first linkage element 221, the second linkage element 222 and the third linkage element 223 are returned to their original positions.

Figure 3:
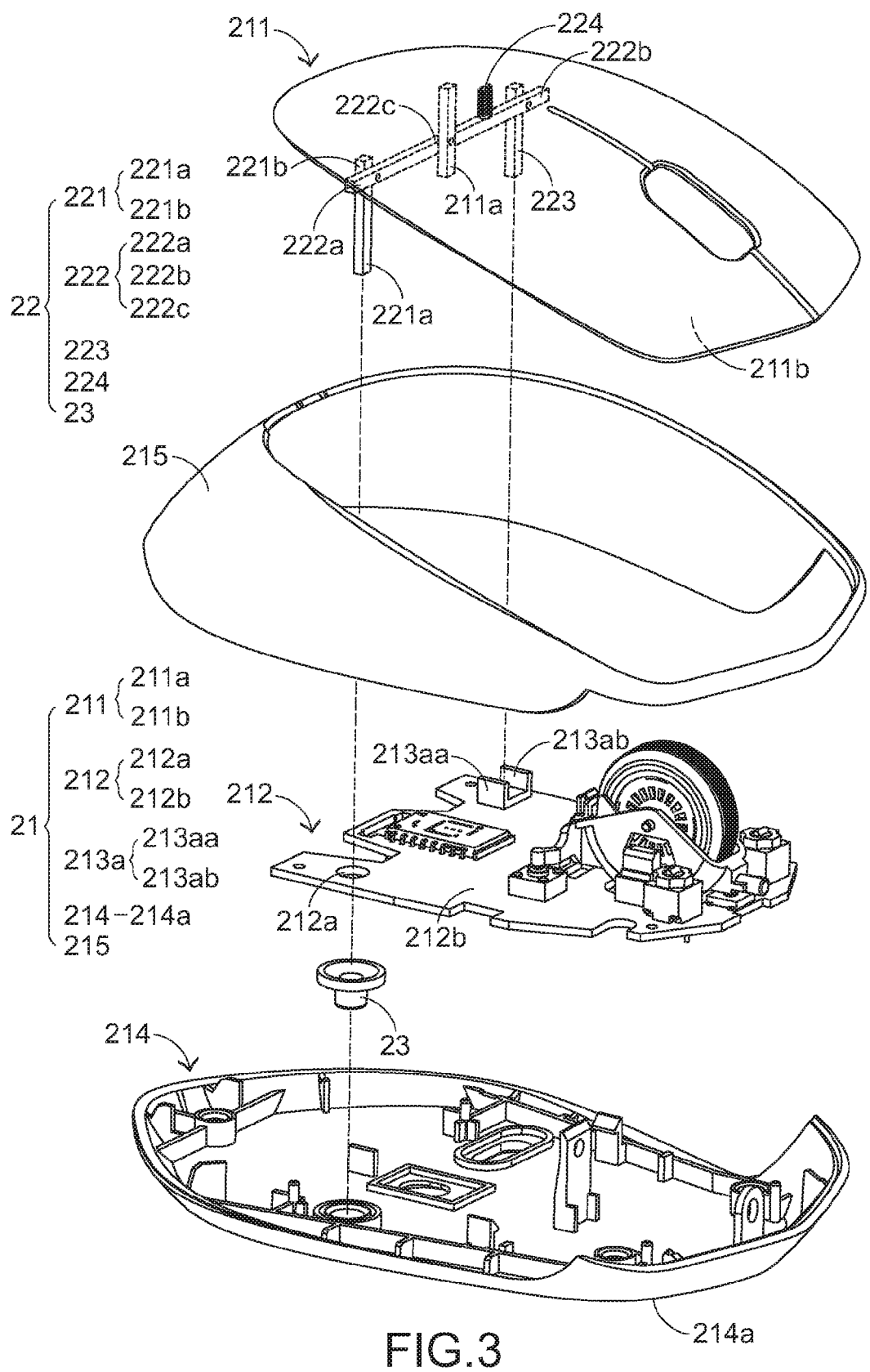
FIG. 3 is a schematic exploded view illustrating a second exemplary switch triggering device of an electronic device according to an embodiment of the present invention.

FIG. 3 is a schematic exploded view illustrating a second exemplary switch triggering device of an electronic device according to an embodiment of the present invention. In comparison with FIG. 2, the switch as shown in FIG. 3 is a photo interrupter switch 213a.

The photo interrupter switch 213a comprises a light emitter 213aa and a light receiver 213ab. The light emitter 213aa is used for emitting a light beam. The light receiver 213ab is used for receiving the light beam.

When the third linkage element 223 is moved to a position between the light emitter 213aa and the light receiver 213ab in a direction toward the photo interrupter switch 213a, the light beam from the light emitter 213aa fails to be received by the light receiver 213ab. Under this circumstance, the photo interrupter switch 213a is switched from an on state to an off state in order to generate a corresponding signal.

In an embodiment, the switch triggering device 22 of the present invention is applied to a wireless mouse. Under this circumstance, the button 23 is a connect button. By pressing the button 23, the push switch 213 on the top surface 212b of the circuit board 212 can be correspondingly pressed by the switch triggering device 22. Consequently, the push switch 213 is triggered to establish the pairing relationship between the wireless mouse and a wireless transceiver (e.g. a dongle).

It is noted that the connect button of the wireless mouse is used to generate a shared identification code for the wireless mouse and the dongle. After the connect button is pressed by the user, a corresponding signal is generated. At the time when the signal is received by the wireless mouse and the dongle, the command for generating the shared identification code can be executed.

In another embodiment, the switch triggering device 22 of the present invention is applied to a keyboard. The operating principles are similar to those mentioned above, and are not redundantly described herein.

From the above descriptions, the present invention provides a switch triggering device of an electronic device. In a case that the button at the base of the electronic device is pressed by the user, the switch on the top surface of the circuit board can be controlled by the switch triggering device of the present invention. Under this circumstance, since it is not necessary to install a single switch on the bottom surface of the circuit board, the complexity of fabricating the circuit board is reduced. Moreover, since the seldom-used button is located at the base, the possibility of erroneously touching the button is minimized, and the overall appearance of the electronic device becomes more pleasing.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A switch triggering device of an electronic device, said electronic device comprising an upper cover, a base, a circuit board and a switch, said circuit board being arranged between said upper cover and said base, said switch being disposed on a top surface of said circuit board, said switch triggering device comprising:

a first linkage element penetrated through a through-hole of said circuit board, and comprising a first end and a second end, wherein said first end of said first linkage element is inserted into said base;

a second linkage element comprising a third end, a fourth end, and a connecting part, wherein said third end of said second linkage element is pivotally coupled to a second end of the first linkage element, and said connecting part is arranged between said third end and said fourth end of said second linkage element, wherein said connecting part is pivotally coupled to said upper cover, so that said second linkage element is rotatable relative to said upper cover;

a third linkage element pivotally coupled to said fourth end of said second linkage element, and disposed over said switch; and an elastic element connected with said upper cover and said second linkage element for providing a restoring force to said second linkage element, wherein when said first end of said first linkage element is pressed and moved toward said upper cover, said second linkage element is rotated relative to said upper cover, so that said third linkage element is correspondingly moved toward said switch.

2. The switch triggering device according to claim 1, wherein said switch triggering device further comprises a button, which is located at said base, wherein when said button is pressed, said first linkage element is correspondingly moved.

3. The switch triggering device according to claim 1, wherein said upper cover comprises a protrusion block, wherein said protrusion block is disposed on an inner surface of said upper cover, and said connecting part of said second linkage element is pivotally coupled to said protrusion block.

4. The switch triggering device according to claim 1, wherein said electronic device is a mouse or a keyboard.

5. The switch triggering device according to claim 1, wherein said switch is a push switch or a photo interrupter switch.

* * * * *